United States Patent
Ito

(10) Patent No.: US 11,539,903 B2
(45) Date of Patent: Dec. 27, 2022

(54) IMAGING APPARATUS AND METHOD OF CONTROLLING THE SAME AND NON-TRANSITORY COMPUTER-READABLE STORAGE MEDIUM

(71) Applicant: CANON KABUSHIKI KAISHA, Tokyo (JP)

(72) Inventor: Shigeyoshi Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/578,941

(22) Filed: Jan. 19, 2022

(65) Prior Publication Data
US 2022/0239856 A1    Jul. 28, 2022

(30) Foreign Application Priority Data

Jan. 22, 2021    (JP) .............................. JP2021-008940

(51) Int. Cl.
| | |
|---|---|
| *H04N 5/365* | (2011.01) |
| *H04N 5/357* | (2011.01) |
| *H04N 3/14* | (2006.01) |
| *H04N 5/378* | (2011.01) |
| *H04N 5/3745* | (2011.01) |
| *H04N 5/353* | (2011.01) |

(52) U.S. Cl.
CPC ......... *H04N 5/3658* (2013.01); *H04N 3/1568* (2013.01); *H04N 5/353* (2013.01); *H04N 5/357* (2013.01); *H04N 5/3651* (2013.01); *H04N 5/378* (2013.01); *H04N 5/37452* (2013.01)

(58) Field of Classification Search
CPC .. H04N 3/1568; H04N 5/2176; H04N 5/2178; H04N 5/232; H04N 5/353; H04N 5/357–3675; H04N 5/361; H04N 5/37452; H04N 5/378
See application file for complete search history.

(56) References Cited

U.S. PATENT DOCUMENTS

| | | | |
|---|---|---|---|
| 7,773,135 B2 * | 8/2010 | Watanabe | H04N 5/367 348/241 |
| 7,812,867 B2 * | 10/2010 | Okado | H04N 1/409 348/247 |

FOREIGN PATENT DOCUMENTS

JP    2012-156886 A    8/2012

* cited by examiner

*Primary Examiner* — Lin Ye
*Assistant Examiner* — Chriss S Yoder, III
(74) *Attorney, Agent, or Firm* — Cowan, Liebowitz & Latman, P.C.

(57) ABSTRACT

This invention provides an imaging apparatus comprising a storage storing correction values, a correction circuit which corrects captured image data based on the correction values, a first memory and a second memory, a transferring circuit which transfers the correction values in the storage to the correction circuit, a write circuit which writes the transferred correction values to either the first memory or the second memory, and a controller which controls, in a case where a transfer time of the correction values is longer than a time for image capture processing of one frame, so that, over an image capturing period of a plurality of frames, the write circuit writes new correction values to one of the first and second memory and the correction circuit corrects the captured image data using the current correction values in the other memory.

8 Claims, 6 Drawing Sheets

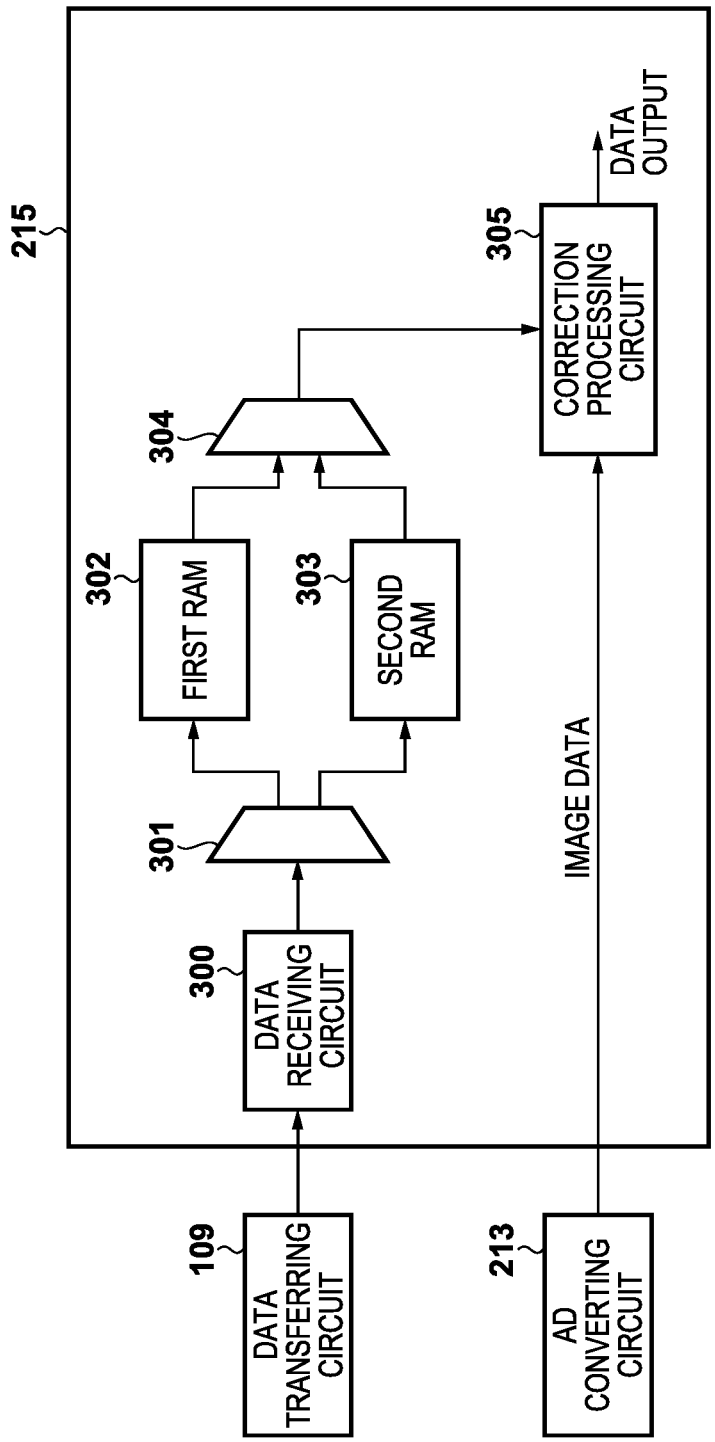

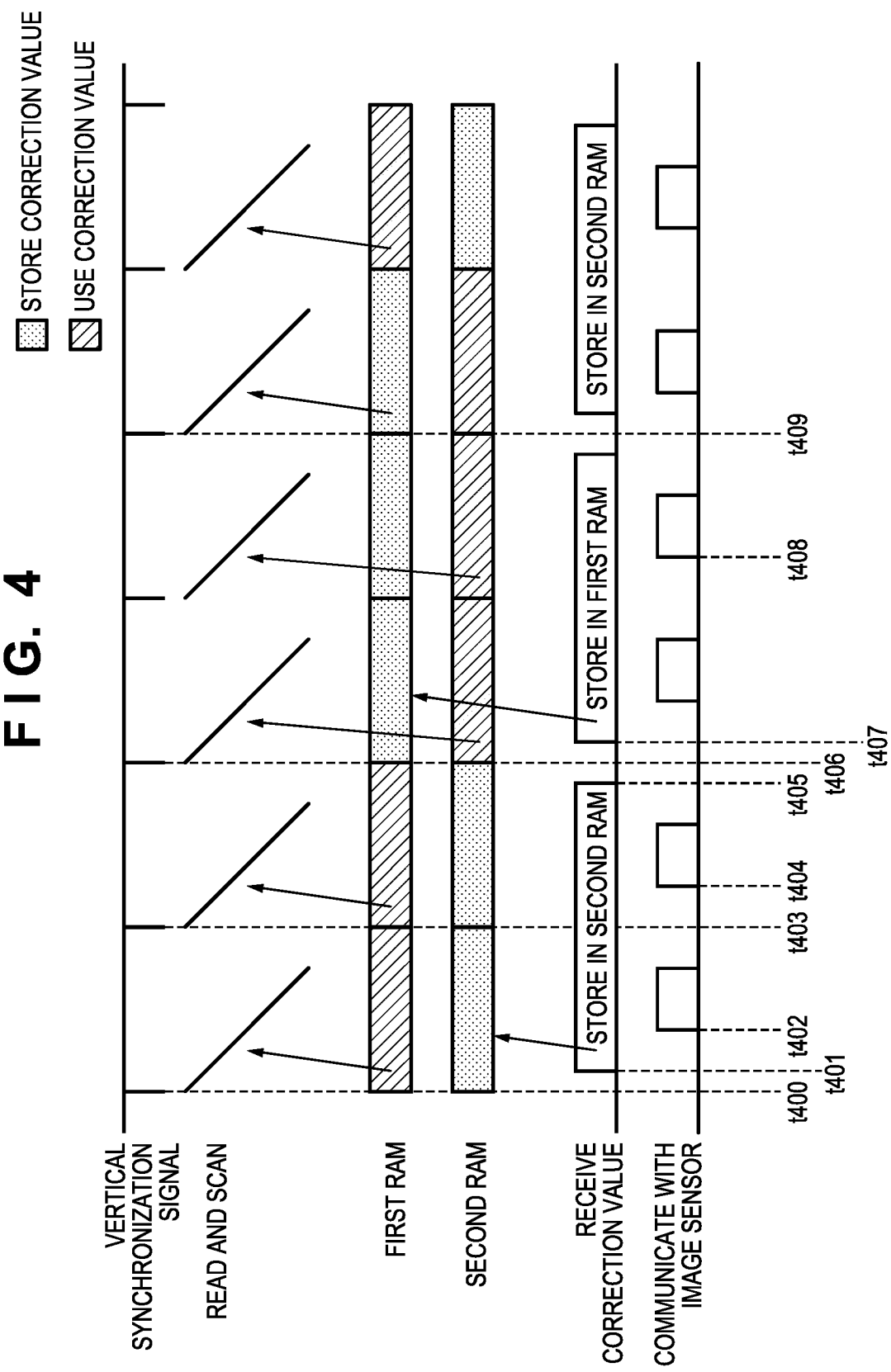

IMAGING APPARATUS AND METHOD OF CONTROLLING THE SAME AND NON-TRANSITORY COMPUTER-READABLE STORAGE MEDIUM

BACKGROUND OF THE INVENTION

Field of the Invention

The present invention relates to an imaging apparatus and a method of controlling the same and a non-transitory computer-readable storage medium.

Description of the Related Art

In conjunction with an increase in the sophistication of functions of image sensors, there has been an increase in image capturing frame rates. In such high frame rate image capturing, different exposure control what is conventional may be required from various reasons and various techniques have been proposed so far.

For example, Japanese Patent Laid-Open No. 2012-156886 discloses a method for switching, during continuous image capturing the tracking speed of exposure control for a high-frame-rate moving image in accordance with a frame rate at which that moving image is to be reproduced.

However, in recent years, image sensors have become even more advanced and it has become possible to capture at still higher frame rates. A higher frame rate means that the processing time per frame is shorter. As a result, various processes that were conventionally performed within one frame no long can be fit into the time for one frame. In particular, since it takes a long time to transmit a correction value to be used in an image correcting circuit for the purpose of improving image quality, the time required for transmission may be longer than the period of the image capturing frame rate. In this case, a mismatch may occur between a correction value and a read setting of the image sensor, resulting in deterioration of image quality.

SUMMARY OF THE INVENTION

The present invention has been made in view of such problems, and provides a technique that enables correction of an image with high accuracy even for high frame rate image capturing.

According to an aspect of the invention, there is provided an imaging apparatus comprising: a storage circuit configured to store a plurality of correction values; a correction circuit configured to correct captured image data based on the correction values; a first memory and a second memory incorporated in the correction circuit; a transferring circuit configured to transfer the correction values stored in the storage circuit to the correction circuit; a write circuit configured to write the correction values transferred by the transferring circuit to either the first memory or the second memory; and a control unit configured to control, in a case where a transfer time of the correction values transferred by the transferring circuit is longer than a time for image capture processing of one frame, so that, over an image capturing period of a plurality of frames, the write circuit writes new correction values to one of the first memory and the second memory and reads current correction values stored in the other memory, and the correction circuit corrects the captured image data.

According to the present invention, it is possible to correct images with high accuracy even for high frame rate image capturing.

Further features of the present invention will become apparent from the following description of exemplary embodiments with reference to the attached drawings.

BRIEF DESCRIPTION OF THE DRAWINGS

FIG. 3 is a block configuration diagram of an image correcting circuit in the embodiment.

FIG. 4 is a timing chart illustrating an image capture operation and a correction operation in the image sensor of the embodiment.

DESCRIPTION OF THE EMBODIMENTS

Figure 1:
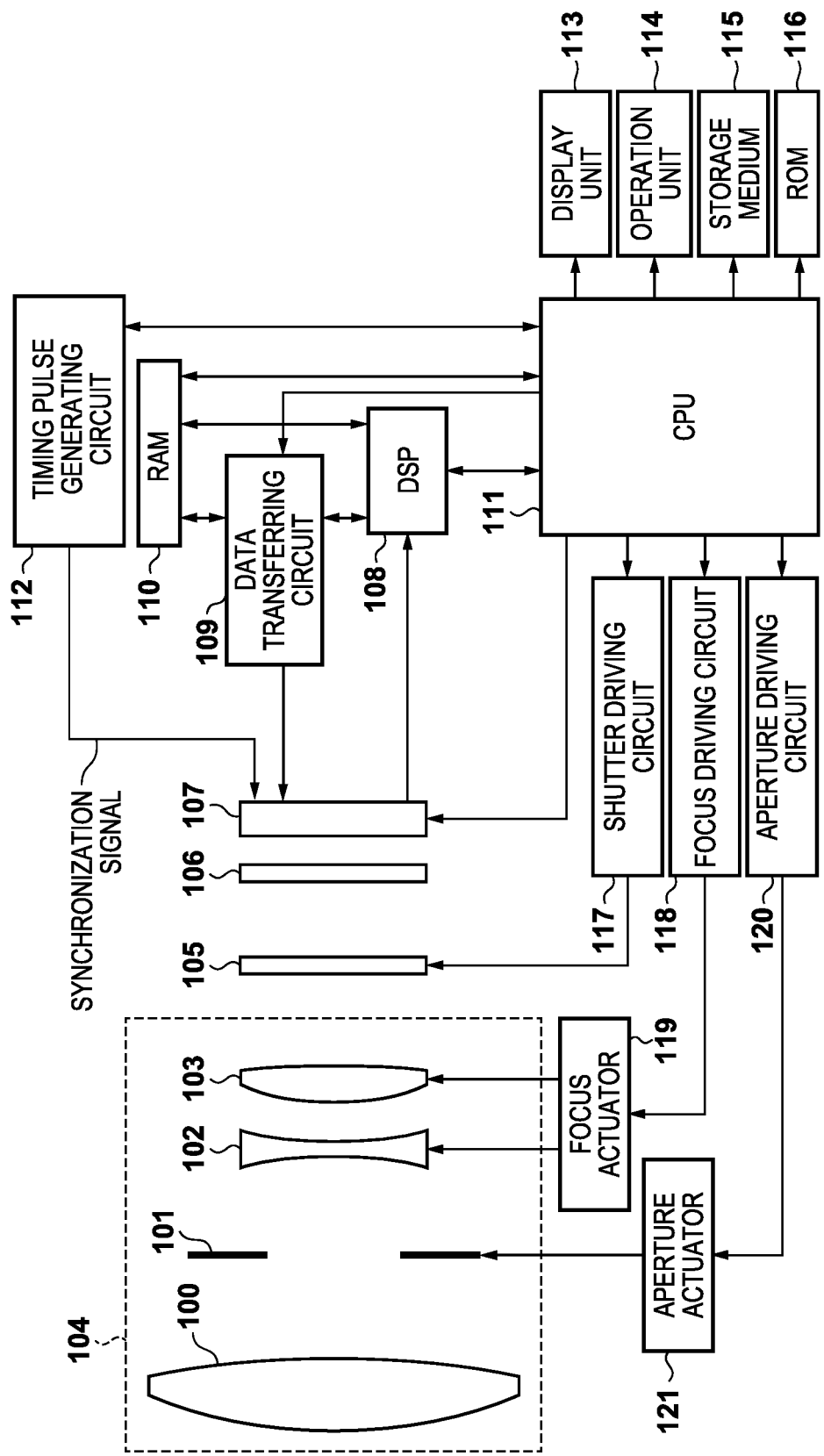
FIG. 1 is a block configuration diagram of an imaging apparatus of an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block configuration diagram of an imaging apparatus according to a first embodiment. In FIG. 1, a first lens 100 is disposed at the distal end of an optical system 104. An aperture 101 adjusts the amount of light at the time of capturing by adjusting an aperture diameter thereof. A second lens 102 and a third lens 103 are driven by a focus actuator 119 (described later), by forward/backward movement in the optical axis direction, to adjust the focus of the optical system 104.

A focal plane shutter 105 has a function for adjusting the exposure time during still image capturing. However, when an electronic shutter according to slit rolling reading of the image sensor 107 is used for adjustment of the exposure time, adjustment of the exposure time is not performed. An optical low-pass filter 106 is used to reduce false color and moiré in the captured image. The image sensor 107 photoelectrically converts an optical image of a subject formed by the optical system 104 into an electric signal. Further, the image sensor 107 includes an electronic shutter function and it is possible to obtain an image by slit rolling reading.

A DSP 108 receives image signals and performs image processing. Further, the DSP 108, in addition to the image processing, performs calculation of information used for driving the focus lens (the second lens 102 and third lens 103) based on information from the image sensor 107. A data transferring circuit 109 is a circuit for transferring a correction value stored in a RAM 110 to the image sensor 107 under control from a CPU 111 to be described later.

The RAM 110 also has a function as an image data storage unit for storing image data processed by the DSP 108, a function as a correction value storage unit for transferring the image data by the data transferring circuit 109, and a function as a work memory when the CPU 111 to be described later performs an operation. Incidentally, when correction values for one frame are made to be one set, a plurality of sets of correction values are stored in this RAM 110.

Additionally, in the present embodiment, these functions are realized by using the RAM 110, but other types of memory can be used as long as the access speed is fast enough and there is no problem in operation. In the present embodiment, the RAM 110 is disposed outside the DSP 108 and the CPU 111, and configuration may be taken such that some or all of the functions are incorporated in the DSP 108 or the CPU 111.

The CPU 111 controls the operation of the imaging apparatus in an integrated manner. Therefore, the CPU 111 executes a program stored in a ROM 116 for controlling each unit of the imaging apparatus. The CPU 111 can control the reading from the image sensor 107 by performing various settings to the image sensor 107. In changeable parameters that the CPU 111 sets for the image sensor 107 there are at least settings relating to ISO sensitivity and settings relating to accumulation time.

Further, the CPU 111 communicates with a timing pulse generating circuit 112 and performs control of the timing of the generation of various timing pulses for controlling the operation of the image sensor 107. A timing pulse generating circuit 112 supplies the generated synchronization signal to the image sensor 107. Thus, the operation timing of the image sensor 107 is controlled.

The CPU 111 also has a function of controlling the focus actuator 119 and adjusting the focus of the optical system 104 using the calculation result outputted from the DSP 108. Furthermore, The CPU 111 also has a function of controlling the aperture actuator 121 through the aperture driving circuit 120 and adjusting the aperture diameter of the aperture 101 of the optical system 104. The CPU 111 can perform control relating to the setting and accumulation time relating to ISO sensitivity for the image sensor 107 described above and perform control relating to adjustment of the aperture diameter for the optical system 104. By this, the CPU 111 handles the control of the exposure of the imaging apparatus.

A display unit 113 displays a still image or a moving image processed by the DSP 108, and further displays various menus or the like. By using a displayed moving image as a viewfinder, the user can perform framing to adjust the capturing range of still image capture and moving image capture. As the display unit 113, a rear display and an electronic viewfinder (EVF) or the like are known. Note, although one display unit 113 is illustrated as a configuration for displaying in FIG. 1, configuration may be taken to include both a rear display and an EVF.

An operation unit 114 is an operation unit such as a button or a lever. Further, the operation unit 114 may include a touch panel. The user gives various instructions to the CPU 111 through the operation unit 114. Of course, these include the setting of the imaging conditions and an imaging instruction by the user. The CPU 111 performs control according to instructions from the user.

A storage medium 115 is a removable storage medium for recording still image data and moving image data. Although it is assumed that the storage medium 115 is typically a removable storage medium as typified by an SD memory card, the storage medium may be fixed to the apparatus. The ROM 116 stores a program that the CPU 111 loads and executes to control the operation of each unit.

A shutter driving circuit 117 drives and controls the focal plane shutter 105. A focus driving circuit 118 functions as a focus position changing means for changing the focal position of the optical system 104 and, by controlling the focus actuator 119 based on the output of CPU 111, performs focus adjustment by driving to cause the focus lens (second lens 102, third lens 103) to move forward/backward in an optical axis direction. The aperture driving circuit 120 controls the aperture actuator 121 to control the amount (F-value) of the opening of the aperture 101.

The image sensor 107 of the present embodiment is described with reference to FIG. 2A and FIG. 2B.

Figure 2A:
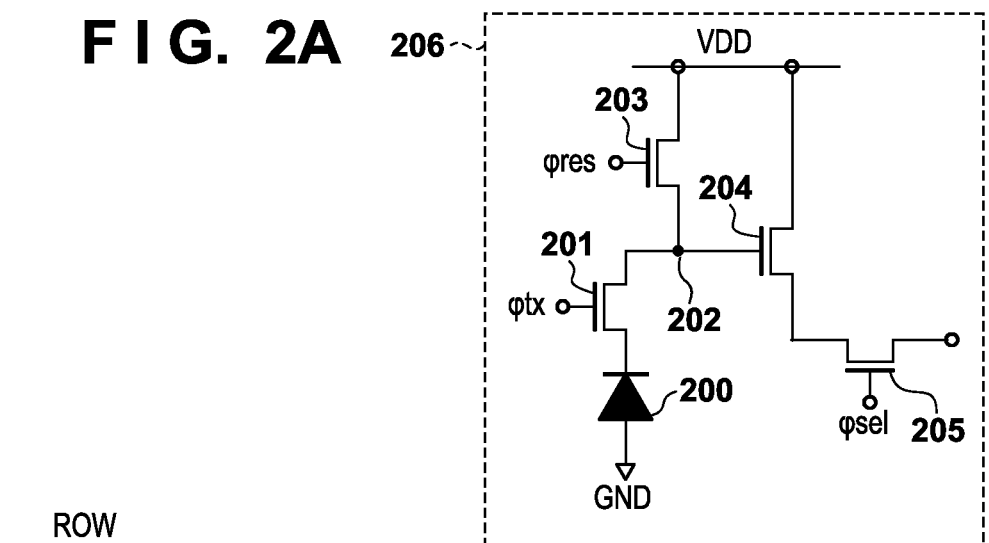
FIG. 2A is a circuit configuration diagram of unit pixels of an image sensor.
Figure 2B:
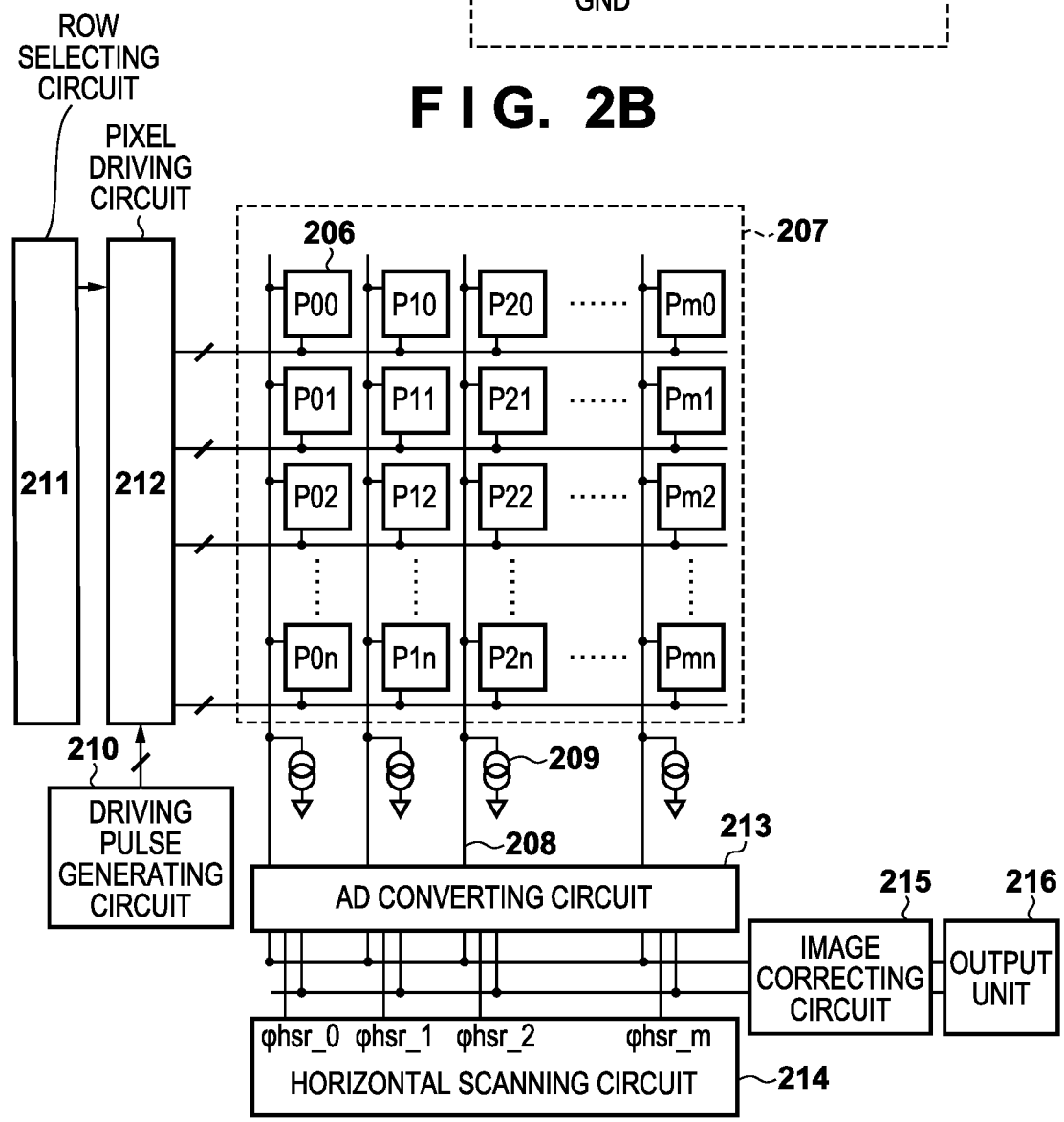
FIG. 2B is a block configuration diagram of the image sensor of the embodiment.

First, FIG. 2A illustrates a circuit configuration of a unit pixel 206. A photodiode 200 (hereinafter, PD 200) is an element forming the unit pixel 206 which is below a microlens and is a photoelectric conversion unit. A transfer switch 201 is a switch which is controlled by a signal φtx. By setting the value of the signal φtx to High (hereinafter, H), it is possible to transfer a photoelectric charge accumulated in the PD 200 to a floating diffusion unit (FD 202).

A reset switch 203 is a switch which is controlled by a signal φres so as to initialize the FD 202. A pixel reset operation is realized by setting both the signal φtx and the signal φres to H, and by setting both the PD 200 and FD 202 to the power supply voltage (VDD). A pixel amplifier transistor 204 is connected to a constant current source 209 to be described later via a select switch 205, and a vertical output line 208 to be described later.

When the value of an input signal φsel of the select switch 205 is H, the pixel amplifier transistor 204 is connected to the constant current source 209 to form a pixel amplifier. Since the FD 202 is connected to the pixel amplifier, charge transferred to the FD 202 from the PD 200 is converted into a voltage value corresponding to the charge amount by the pixel amplifier, and is outputted as a pixel signal to the vertical output line 208 (reference FIG. 2B).

Next, a circuit block diagram of the image sensor 107 is described with reference to FIG. 2B. The pixel array 207 has a structure in which a plurality of unit pixels 206 are arranged in a matrix. Specifically, (m+1) pixels in the horizontal direction and (n+1) pixels in the vertical direction of unit pixels 206 are arranged. Here, both m and n are natural numbers.

A driving pulse generating circuit 210 generates a pulse for performing a reset operation or a read operation of the unit pixel 206. The generated pulse is provided to a pixel driving circuit 212. A row selecting circuit 211 selects the pixel row to which to supply the pulse generated by the driving pulse generating circuit 210 and sets the selected pixel row in the pixel driving circuit 212. The pixel driving circuit 212 supplies the pixel row set by the row selecting circuit 211 with the pulse generated by the driving pulse generating circuit 210.

A pixel signal is outputted for each pixel row to a vertical output line 208 in response to a pulse supplied from the pixel driving circuit 212. A constant current source 209 is paired with a pixel amplifier transistor 204 to form a source follower circuit. An AD converting circuit (hereinafter, the ADC 213) converts an analog output outputted to the vertical output line 208 into a digital value corresponding to the output.

In the ADC 213, AD converting circuits having the same circuit configuration are manufactured individually for each column. However, even circuits having the same circuit configuration have different characteristics due to variations in transistor manufacturing. This variation in characteristics for each pixel array appears as column offset variation in an image. Further, since the variation of the column offset varies depending on the state in which AD conversion is performed, the state changes with a change in ISO sensitivity.

Therefore, in order to correct the variation of the column offset, the pixel signal converted into a digital value by the ADC 213 is selected in order by the horizontal scanning circuit 214 and is transferred to the image correcting circuit 215. The image correcting circuit 215 receives the correction value of the column offset stored in the RAM 110 through the data transferring circuit 109 and performs correction processing of the pixel signal using the correction value.

By such correction of the pixel signal, the influence on the image of the variation in the column offset due to variation in the manufacturing of transistors can be reduced, and an image with good image quality can be obtained. Note, details relating to the image correcting circuit 215 are described in detail in FIG. 3. A pixel signal processed by the image correcting circuit 215 is externally output to the image sensor 107 through the output unit 216.

Note, in the present embodiment, the pixel driving circuit 212, the ADC 213, or the image correcting circuit 215 are incorporated in the image sensor 107, but they may be provided on a separate chip from the image sensor 107. Also, in the present embodiment, the type of the correction value is a correction value according to ISO sensitivity for correcting variations in the column offset, but the type of the correction value is not limited thereto. For example, a correction value for correcting variation of column gain, or any other correction value may be used.

Here, it is assumed that the time it takes for the data transferring circuit 109 to transfer the correction value of the column offset for one frame (all lines) from the RAM 110 to the image correcting circuit 215 of the image sensor 107 (depending on transfer bus specifications, the resolution of the image sensor, and the like) is 4.9 ms. It is assumed that the user selects a mode for capturing at 240p (240 frames per second) as a typical example of a high frame rate from the operation unit 114. In this case, since the driving cycle according to imaging is $1/240$ seconds, the time required for correction processing of one frame becomes 4.17 ms ($=1/240$ seconds).

Now, it is assumed that a new correction value needs to be transferred because the user has changed the ISO sensitivity or the ISO sensitivity has been changed by an automatic exposure determination process. In this case, the correction value is not transferred in time for the correction process. In the present embodiment, in this way, even when "the time relating to the transfer of the correction value>the time relating to the correction processing for one frame" is set, switching of the appropriate correction process is enabled. Therefore, in the embodiment, when transfer of the correction value across a plurality of frames is performed and the transfer has completed, correction processing by a corrected correction value is enabled to start.

In order to realize the above-described processing, explanation regarding details of the image correcting circuit 215 is given with reference to FIG. 3. Incidentally, the same reference numerals are given to configuration elements already described in other drawings, and the description thereof will be omitted.

The image correcting circuit 215 has a data receiving circuit 300 for receiving column offset correction values (data indicating a positive or negative signed values) which has been transmitted from the data transferring circuit 109. The data receiving circuit 300 stores the received column offset correction values, through a router 301, to either a first RAM 302 or a second RAM 303. The router 301 is controlled by the CPU 111 and can switch the write target at any timing.

Note that the first RAM 302 and the second RAM 303 both have a capacity capable of storing column offset correction values for one frame (for all lines), and when one is in the write mode, the other is in the read mode.

A selector 304 is connected to both the first RAM 302 and the second RAM 303, and it is possible to connect either of the two RAMs to a correction processing circuit 305. The correction processing circuit 305 reads the column offset correction values from either the first RAM 302 or the second RAM 303 that the selector 304 selected and corrects the column offset variation of the pixel signal using the column offset correction values.

Since the column offset variation is a variation of the offset for each pixel column, the correction is performed for each pixel column. When certain pixel data is inputted from the AD converting circuit 213 to the correction processing circuit 305, the correction processing circuit 305 reads the corresponding column offset correction value from the RAM selected by the selector 304 and performs addition and subtraction processing on the pixel data.

Next, using the timing chart of FIG. 4, an image capture operation and a correction operation in the image sensor 107, and also the column offset correction value transmission timing will be explained. The image sensor 107 receives an imaging instruction issued by the user pressing a capture start button provided on the operation unit 114, for example, and starts an image capture operation. Note, diagonal lines in the figure represent the degree of progress of the read from the image sensor. The diagonal line indicates a raster scan period of one frame, the upper left end thereof represents the read timing of the first pixel in the frame imaged by the image sensor, and the lower right end of the diagonal line represents the read timing of the last pixel of the frame.

At timing t400, when the timing pulse generating circuit 112 asserts the vertical synchronization signal (VD), the image sensor 107 starts reading the pixel signal. At the same time as starting the reading of the pixel signal, the image correcting circuit 215 starts correction of the pixel data. At this time, the selector 304 selects the first RAM 302. Therefore, the correction processing circuit 305 corrects the pixel data using the column offset correction values already stored in the first RAM 302.

At timing t401, the data transferring circuit 109 reads the column offset correction values from the RAM 110, and starts to transmit to the data receiving circuit 300 of the image correcting circuit 215. At this time, the router 301 selects the second RAM 303. Therefore, the column offset correction values received by the data receiving circuit 300 are stored in the second RAM 303.

In this way, it is possible to have a configuration in which the RAM that stores the column offset correction values used for correction and the RAM that rewrites the data stored with the column offset correction values from the data receiving circuit are separated. By this, the data receiving circuit 300 can receive the column offset correction values without destroying the column offset correction values used for correction of the image.

At timing t402, the image correcting circuit 215 performs communication for operation of the image sensor 107 of the next frame. At timing t403, when the timing pulse generating circuit 112 asserts the VD, the image sensor 107 starts reading the pixel signal of the next frame. At this time, the column offset correction values whose transmission started at the timing t401 have not yet finished being transmitted. At this time, the selector 304 continues to select the first RAM 302.

Therefore, the correction processing circuit 305 corrects the pixel signal using the column offset correction values already stored in the first RAM 302. In the case of this control, only the column offset correction values stored in the first RAM 302 can be applied to the read started at the timing t403. Therefore, in a case where the association between the ISO sensitivity corresponding to the column offset correction values stored in the first RAM 302 and the ISO sensitivity corresponding to the read started at the timing t403 is not correct, the image cannot be corrected correctly. Therefore, in the communication with the image sensor 107 performed at the timing t402, the ISO sensitivity is not changed.

At the timing t403, the CPU 111 changes various parameters of the image sensor 107. This setting does not take effect at the time of setting, but is valid at the timing t406 at which the next VD is asserted. Next, reception of the column offset correction values is completed at the timing t405 which is a time before the timing at which VD is asserted. Then, the image can be corrected by the column offset correction values stored in the second RAM 303.

The CPU 111 changes the ISO sensitivity so that the setting value set at the timing t404 corresponds to the column offset correction values stored in the second RAM 303 from the timing t401 to t405. Further, the CPU 111, switches the router 301 at the timing t406 from the second RAM 303 to the first RAM 302. Also, at this timing t406, the CPU 111 switches the selector 304 from the first RAM 302 to the second RAM 303. Consequently, the write/read mode of the first RAM 302 and the second RAM 303 are switched.

By controlling in this way, configuration can be taken such that it is possible to switch the parameters of the image sensor 107 from the frame read from the timing t406 so that there is no mismatch between the ISO sensitivity that the column offset correction values correspond to and the ISO sensitivity setting that is set in the image sensor 107.

Also, regarding the storage of the column offset correction values, the column offset correction values whose reception starts from the subsequent timing t407 are switched to be stored in the first RAM 302. Therefore, it is also possible to continue receiving data so as not to destroy the correction value that is in use. Similarly, the column offset correction values whose transmission starts from the timing t407 can be reflected from the timing t409.

Although configuration may be such that the above-described switching of the correction value is performed only when it is necessary to switch the correction value, the control may be simplified by periodically performing the switch even when it is not necessary to switch the correction value. In that case, the update period of the correction value is performed in a second period from the timing t401 to t407, which is longer than the time interval from the timing t400 to t403 which is the imaging period. The setting to the image sensor 107 can also be performed in a second period which is a time interval from the timing t404 to t408. So as to not destroy the correction value during transmission, the second period is controlled so as to be longer than the timing t401 to t405 which is the time taken for transmitting the correction value.

In the present embodiment, while the change of the ISO sensitivity setting affects the correction value type of the image, it does not affect the image correction value type of the accumulation time or the aperture diameter. However, in order to control the exposure, it is necessary to appropriately control these three parameters at the same time. Therefore, the change of the accumulation time or the aperture diameter is also controlled so as to be changed only at the timing of changing the setting of the ISO sensitivity.

As described above, according to the present embodiment, in a case where the interval for image capturing is shorter than the transfer time of the correction value for one frame, correction values are written into two memories (the first RAM and the second RAM) and read out correction values can be maintained or switched appropriately at a timing essentially based on the vertical synchronization signal. Thus, even when the frame rate is high, reading of the correction values in the correction processing is appropriately performed, and a high-quality image can be obtained.

Figure 5:
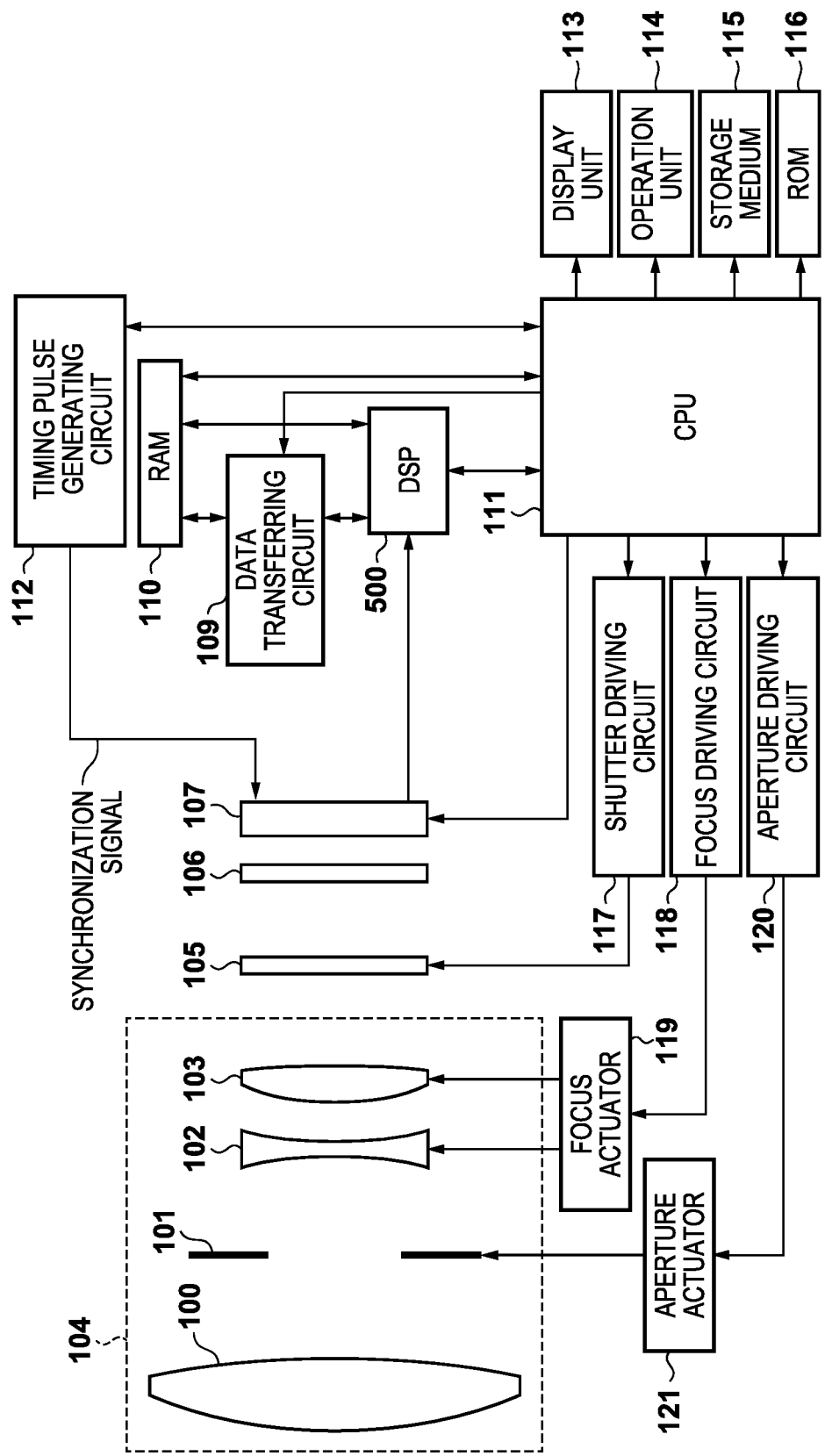
FIG. 5 is a block configuration diagram of the imaging apparatus as a variation.

Note, although an example in which the image correcting circuit 215 is incorporated in the image sensor 107 has been described in the above embodiment, the image correcting circuit 215 may be outside the image sensor 107. FIG. 5 is a block configuration diagram of a case in which a circuit corresponding to the image correcting circuit 215 is provided outside of the image sensor 107. In FIG. 5, the image correcting circuit 215 is configured to be incorporated in a DSP 500. In this instance, the data transferring circuit 109 is connected to the DSP 500. The DSP 500 also has the function of the DSP 108 in the first embodiment.

Further, for facilitating understanding in the above embodiment, as specific imaging conditions, the time required for transfer of the correction value of one frame is described as being 4.9 ms and the frame rate at the time of capturing as being 240 fps. That is, in the case of such conditions, transfer of the correction value using a period of two frames is performed and the router 301 and the selector 304 switch according to the vertical synchronization signal immediately after the transfer is completed.

In the period (=4.17×2 ms) for two frames in which the correction value is being transferred, the write/read mode of the first RAM 302 and the second RAM 303 is maintained, and the write/read mode is switched based on the vertical synchronization signal immediately after transfer completion. If the above is expressed as a generalization as follows.

The time required to transfer the correction value for one frame is defined as "T" (seconds), and the frame rate set by the user is defined as "F" (fps). In this case, the CPU 111 obtains the smallest natural number, n, that satisfies the following equation.

$$T<n/F$$

Then, the CPU 111, in the period of n frames (=n/F), maintains the write/read mode of the first RAM 302 and the second RAM 303, and performs the transfer (write) of the correction value to the RAM which is in the write mode. Then, the CPU 111 switches the router 301 and the selector 304, switches the write/read modes of the first RAM 302 and the second RAM 303 according to the vertical synchronization signal immediately after the transfer is completed, and sets the imaging conditions on the image sensor 107.

Second Embodiment

In the above-described first embodiment, a method of controlling such that an image to be read and a correction value match even when the image is obtained at a high frame rate is described. However, by that method, a frame rate at which a change in brightness is followable is lower than the capturing frame rate of the image.

Although it is still possible to sufficiently follow the change in brightness of a subject in a case where the capturing frame rate is sufficiently high, even at a common capturing frame rate such as 30 fps, it becomes impossible to follow the change in brightness of a subject when the method described in the first embodiment is applied. Therefore, in the second embodiment, a method for switching the operation of the imaging apparatus according to the frame rate is disclosed.

Further, for a plurality of images thus obtained, it is possible to generate several types of image data by changing the image processing method in the DSP 108. Therefore, in the present embodiment, switching of image processing of the plurality of images is introduced.

Figure 6:
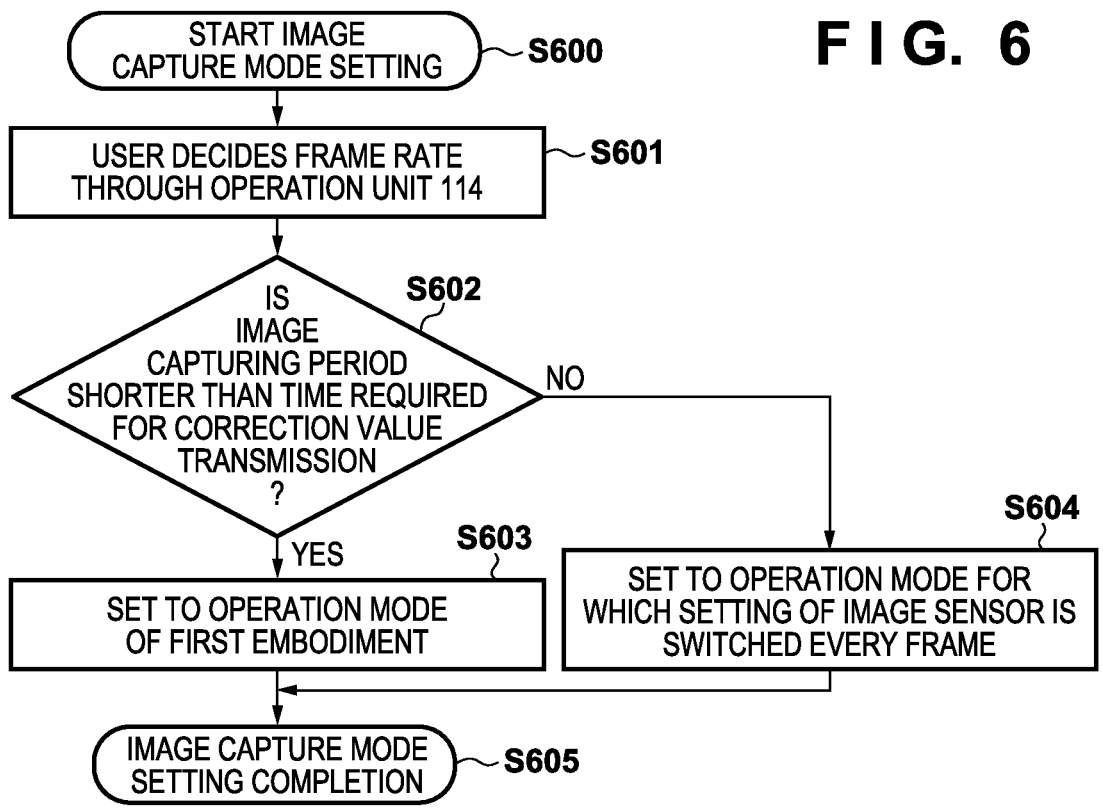
FIG. 6 is a flowchart illustrating processing for switching an operation mode in the embodiment.

FIG. 6 is a flowchart illustrated a method for switching operation modes in accordance with a frame rate setting.

In step S600, the CPU 111 starts setting of the image capture mode.

In step S601, the CPU 111 accepts the setting of the frame rate by the user through the operation unit 114.

In step S602, the CPU 111 determines whether the image capturing period (inverse of the frame rate) between frames at the set frame rate is shorter than the time required for transmitting a correction value. Note, before reaching this step, the time required for transmitting the correction value and the image capturing period for each frame rate may be calculated.

In this case, in step S602, the CPU 111 determines whether or not the set frame rate is equal to or higher than a predetermined frame rate. Then, control is taken such that the processing transitions to Yes if the frame rate is equal to or higher than the predetermined frame rate and to No if the frame rate is less than the predetermined frame rate.

In step S602, in a case where the CPU 111 determines that the image capturing period of the image for the set frame rate is shorter than the required time for transmitting the correction value, the processing transitions to step S603.

In step S603, CPU 111 loads a program for performing the operation shown in the first embodiment and transitions to completion of the image capture mode setting of step S605.

Meanwhile, in step S602, the CPU 111 determines that the image capturing period of the image for the set frame rate is longer than the required time for transmitting the correction value, the processing transitions to step S604.

In step S604, the CPU 111 loads a program that performs a normal operation that differs from the operation described in the first embodiment. Here, the normal operation is an operation in which the ISO sensitivity setting of the image sensor can be switched every frame. Once loading of the program is completed, the processing transitions to the completion of the image capture mode setting of step S605.

Figure 7:
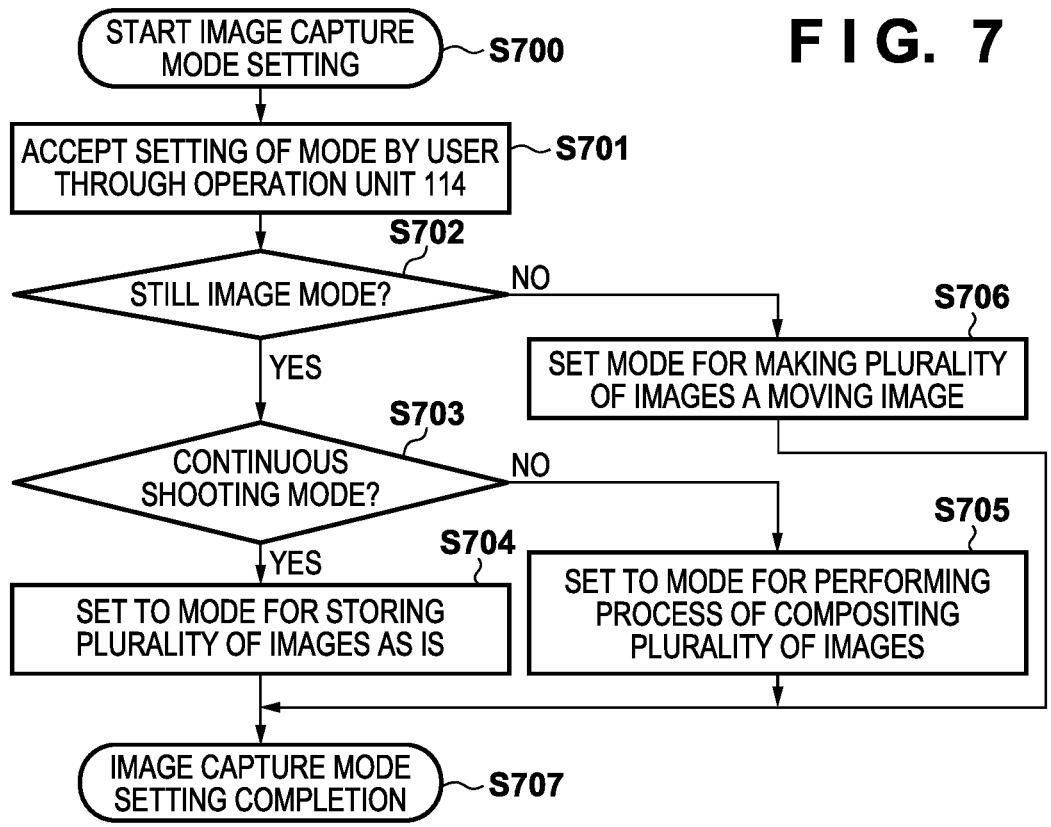
FIG. 7 is a flowchart illustrating setting processing relating to switching of image processing of a plurality of images.

FIG. 7 is a flowchart illustrating a setting process in a case of continuously capturing a plurality of images.

In step S700, the CPU 111 starts setting of the image capture mode.

In step S701, the CPU 111 accepts the setting of the mode by the user through the operation unit 114.

In step S702, the CPU 111 determines whether or not the set mode is the still image mode. When the CPU 111 determines that the mode set by the user is the still image mode, the processing transitions to step S703. If this is not the case (in the case of a video mode), the CPU 111 switches the processing to step S706.

In a case where the processing transitions to step S703, the CPU 111 determines whether the continuous shooting mode has been set. In a case where it is determined that the continuous shooting mode has been set, the CPU 111 transitions the processing to step S704. If this is not the case (in the case of a compositing mode), the CPU 111 switches the processing to step S705.

In a case where the processing transitioned to step S704, the CPU 111 loads a program for the continuous shooting mode that stores the obtained images of a plurality of frames as a plurality of still images as is, and the processing transitions to the completion of the image capture mode setting of step S707. Note, in the continuous shooting mode, control is performed so that the above-described correction value can be changed even during continuous shooting. However, depending on the relationship between the continuous shooting speed (frame rate) and the time required for transferring the correction value, control is performed so that the correction value is not changed.

In a case where the processing transitioned to step S705, the CPU 111 loads a program for compositing mode that generates one composite image from the obtained images of a plurality of frames, and the processing transitions to the completion of the image capture mode setting of step S707. Note, in this compositing mode, in the period for capturing a plurality of still images to be composited, control is performed so as not to change the correction value described above.

In a case where the processing transitioned to step S706, the CPU 111 loads a program for the video mode in which the obtained images of a plurality of frames are made into a moving image, and the processing transitions to image capture mode setting completion in step S707. Note, in the video mode, control is performed so that it is possible to change the correction value described above, and depending on the relationship between the frame rate and the time required for transferring the correction value, control is performed so that the correction value is not changed.

As described above, according to the second embodiment, by following the flowchart of FIG. 6, it is possible to switch the ISO sensitivity setting for each plurality of frames and appropriately switch the correction value and the setting of the image sensor at a high frame rate. Also, the ISO sensitivity setting can be switched for each frame and the ISO sensitivity setting can be made to follow a change in brightness of the subject at a low frame rate.

Furthermore, according to the flowchart of FIG. 7, it is possible to process a plurality of images obtained by the method shown in the first embodiment as desired by the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-008940, filed Jan. 22, 2021, which is hereby incorporated by reference herein in its entirety.

What is claimed is:

1. An imaging apparatus comprising:
   a storage circuit configured to store a plurality of correction values;
   a correction circuit configured to correct captured image data based on the correction values;
   a first memory and a second memory incorporated in the correction circuit;
   a transferring circuit configured to transfer the correction values stored in the storage circuit to the correction circuit;
   a write circuit configured to write the correction values transferred by the transferring circuit to either the first memory or the second memory; and
   a control unit configured to control, in a case where a transfer time of the correction values transferred by the transferring circuit is longer than a time for image capture processing of one frame, so that, over an image capturing period of a plurality of frames, the write circuit writes new correction values to one of the first memory and the second memory and reads current correction values stored in the other memory, and the correction circuit corrects the captured image data.

2. The apparatus according to claim 1, wherein the plurality of correction values stored in the storage circuit correspond to respectively different ISO sensitivities.

3. The apparatus according to claim 1, wherein the correction circuit is embedded in an image sensor.

4. The apparatus according to claim 1, wherein the control unit performs the control in a case where a moving image is to be obtained.

5. The apparatus according to claim 1, wherein the control unit performs the control in a case where an image of a continuous shooting mode is to be obtained.

6. The apparatus according to claim 1, wherein the control unit performs the control in a case where images of a plurality of frames to be used for generating one composite image are to be obtained.

7. A method of controlling an imaging apparatus which include:
   a storage circuit configured to store a plurality of correction values;
   a correction circuit configured to correct captured image data based on the correction values;
   a first memory and a second memory incorporated in the correction circuit;
   a transferring circuit configured to transfer the correction values stored in the storage circuit to the correction circuit; and
   a write circuit configured to write the correction values transferred by the transferring circuit to either the first memory or the second memory,
   the method comprising:
   controlling, in a case where a transfer time of the correction values transferred by the transferring circuit is longer than a time for image capture processing of one frame, so that, over an image capturing period of a plurality of frames, the write circuit writes new correction values to one of the first memory and the second memory and reads current correction values stored in the other memory, and the correction circuit corrects the captured image data.

8. A non-transitory computer-readable storage medium storing a program which, when read and executed by a computer, causes the steps of a method of controlling an imaging apparatus which include:
   a storage circuit configured to store a plurality of correction values;
   a correction circuit configured to correct captured image data based on the correction values;
   a first memory and a second memory incorporated in the correction circuit;
   a transferring circuit configured to transfer the correction values stored in the storage circuit to the correction circuit; and
   a write circuit configured to write the correction values transferred by the transferring circuit to either the first memory or the second memory,
   the method comprising:
   controlling, in a case where a transfer time of the correction values transferred by the transferring circuit is longer than a time for image capture processing of one frame, so that, over an image capturing period of a plurality of frames, the write circuit writes new correction values to one of the first memory and the second memory and reads current correction values stored in the other memory, and the correction circuit corrects the captured image data.

* * * * *